Figure 1:
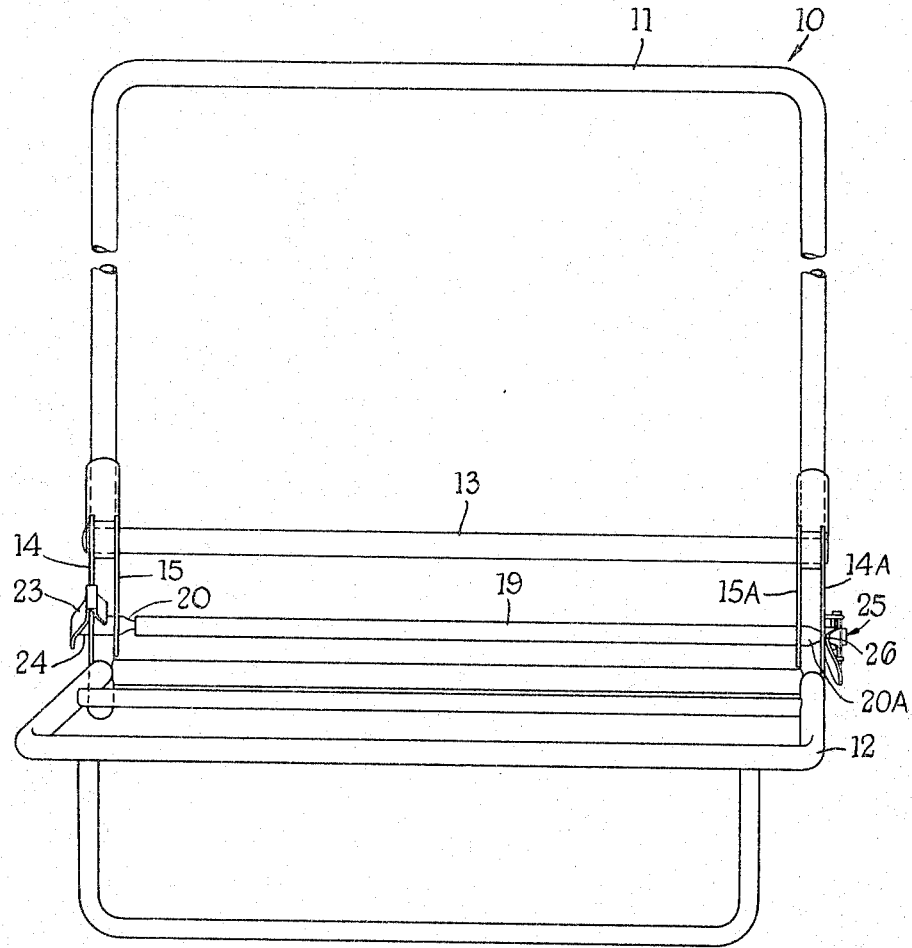

June 13, 1967  E. J. HAMMER  3,325,211

ADJUSTABLE HINGE MECHANISM

Filed May 10, 1965  2 Sheets-Sheet 1

INVENTOR:
ERNEST JOHN HAMMER,
By Philip E. Parker
ATT'Y.

June 13, 1967 E. J. HAMMER 3,325,211
ADJUSTABLE HINGE MECHANISM
Filed May 10, 1965 2 Sheets-Sheet 2
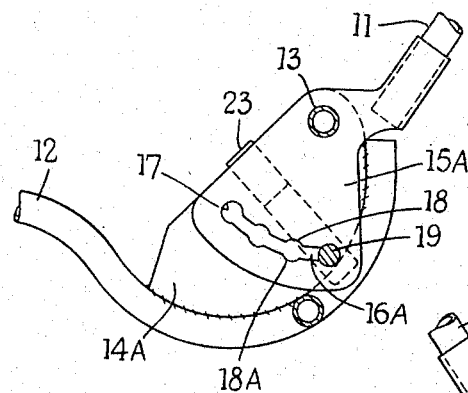
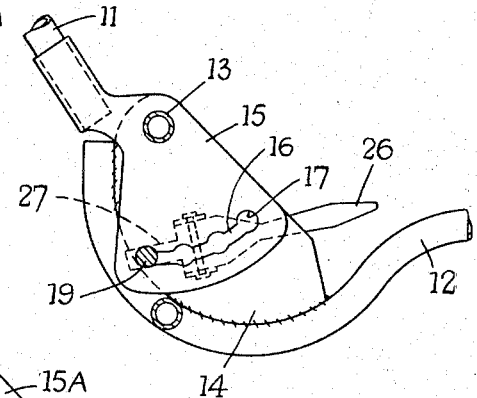
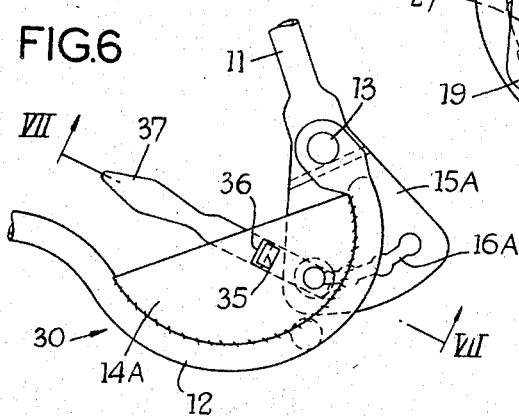
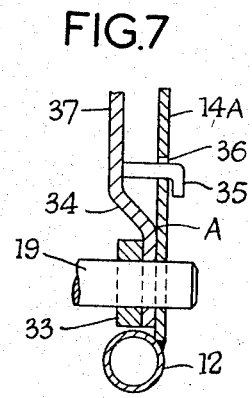
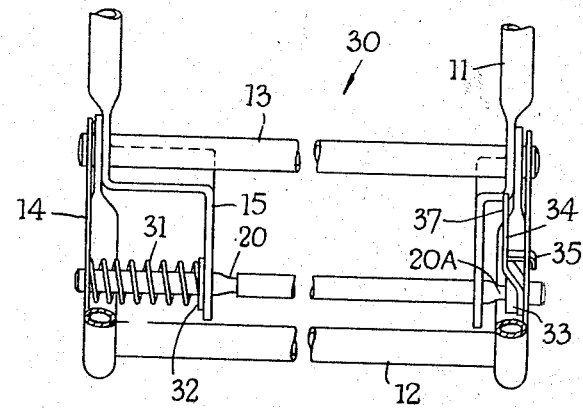
INVENTOR:
ERNEST JOHN HAMMER,
BY Philip E. Parker
ATTY.

United States Patent Office 3,325,211
Patented June 13, 1967

3,325,211
ADJUSTABLE HINGE MECHANISM
Ernest John Hammer, London, England, assignor to United-Carr Incorporated, Boston, Mass., a corporation of Delaware
Filed May 10, 1965, Ser. No. 454,405
Claims priority, application Great Britain, May 22, 1964, 21,233/64
8 Claims. (Cl. 297—370)

The present invention relates to an adjustable hinge mechanism which enables the members hinged together to be releasably secured in a number of relative angular positions and which is particularly suitable for use on a vehicle seat to give angular adjustment of the squab relative to the seat.

It is an object of the present invention to provide a mechanism for use on a vehicle seat which gives easy manual adjustment of the squab relative to the seat and which, at the same time provides a strong and reliable connection between the squab and the seat with a high resistance to shear.

According to the invention there is provided an adjustable hinge mechanism comprising a first member pivoted to a second member, the first member having a rigidly attached and arcuately slotted plate rotatable about the pivot point, the arcuate slotting being provided on a radius from the pivot point and having a plurality of spaced recesses along its length, and the second member carrying a rod extending in parallel with the pivotal axis through the slot in the plate on the first member and constrained by the second member for axial movement only, the rod being formed with a locking portion of greater diameter than the width of the slot and a portion of reduced diameter and being movable axially against a spring member from a locked position in which the locking portion extends through a recess in the slot and movement of the plate over the rod is prevented to a free position in which the portion of reduced diameter extends through the slot in the plate and the plate is freely movable over the rod allowing pivoting movement of the plate and the first member relative to the second member.

According to a further aspect of the invention there is also provided an adjustable seat comprising a squab pivoted to a fixed seat, aligned arcuately slotted plates rigidly attached on either side of the squab and rotatable with the squab about the pivotal axis of the squab and a rod attached to the seat in parallel with the pivotal axis and axially movable through the slotted plates on the squab, the arcuate slots having a plurality of spaced recesses and the rod having two locking portions and two portions of reduced diameter, the rod being permanently spring urged into a position in which the locking portions extend through recesses in the slots in the plates and movement of the rod along the slots and pivoting movement of the plates over the rod are prevented and being movable axially against the spring force into a position in which the portions of reduced diameter extend through the slots and the rod is freely movable along the slots allowing pivoting movement of the plates.

Figure 2:
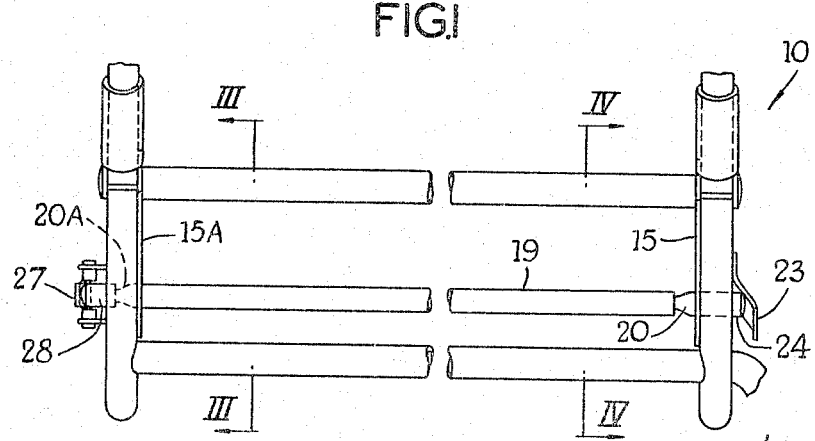

Preferred forms of the invention will now be described with reference to the accompanying diagrammatic drawings, in which:

FIGURES 1 and 2 are respectively a front and rear elevation of a vehicle seat frame, FIGURE 2 being partly broken away, showing the adjustable hinge mechanism of the invention, FIGURES 3 and 4 are respectively views on the lines III—III and IV—IV of FIGURE 2, FIGURES 5 and 6 are respectively a front elevation and side elevation of a modification of the mechanism of FIGURES 1 and 2, and FIGURE 7 is a section on the line VII—VII of FIGURE 6.

In FIGURES 1 and 2 the tubular metal framework of a vehicle seat is indicated generally at 10.

The framework 10 comprises a seat frame 11 and a squab frame 12 which are pivoted together by a rod 13.

The seat frame 11 carries two vertically disposed plates 14, 14a and the squab frame 12 carries two vertically disposed plates 15, 15a. The rod 13 passes through the seat plates 14, 14a and the squab plates 15, 15a, which are located between the seat plates. The seat frame 11 is normally fixed rigidly to the chassis of a vehicle and the squab frame is free to pivot on the rod 13 relative to the seat frame 11.

The squab plates 15, 15a are segmental in shape and the rod 13 passes through or adjacent the apices of the squab plates which thus pivot around the rod 13 when the back frame 12 is pivoted relative to the seat frame 11.

Arcuate slots 16, 16a respectively are formed in the squab plates 15, 15a on a radius from the rod 13 and each slot is formed with four spaced recesses 17 each of which comprises two facing arcuate cut outs 18, 18a formed in the opposite edges of the slot.

The recesses in the two squab plates are aligned and a rod 19 passes through the slots in the two squab plates and through apertures in the seat plates 14, 14a which are located outside the squab plates.

The rod 19 is formed with two grooves 20, 20a which are located immediately adjacent and to the same hand of the squab plates 15 and 15a respectively.

The diameter of the rod 19 is such that it can pass through the recesses 17 in the squab plates but cannot pass along the arcuate slots 16, 16a from one recess to the next. Thus, pivoting movement of the squab plates is prevented when the rod 19 is located through the slots.

The rod 19 is movable axially through the slots and axial movement of the rod in a direction towards the squab plate 15 moves the grooves 20, 20a into alignment with the squab plates 15, 15a. The grooves are of reduced diameter relative to the remainder of the rod 19 and thus when the shaft is in this position the slots in the squab plates can be moved freely over the grooves in the rod.

The rod 19 is permanently urged through the plates 14 and 15 towards the plates 14a, 15a by a leaf spring 23 which is engaged over the edge of the plate 14 and which bears resiliently against one end 24 of the rod 19.

A lever 25 which is pivoted to the outside of the plate 14a comprises at one end a finger tag 26 and at the other end an actuating arm 27 which bears against the other end 28 of the rod 19. Movement of the rod 19 under pressure of the spring 23 is limited by the lever 25 which is pivoted by the rod until the tag 26 abuts the plate 14a preventing any further movement of the rod under the action of the leaf spring 23.

The rod 19 is normally held, under the action of the spring 23, with the grooves 20, 20a to one side of the slots 16, 16a in the squab plates 15, 15a and the squab frame 12 is thus normally locked against rotation relative to the seat frame 11.

If the finger tag 26 of the lever 25 is lifted away from the plate 14a the actuating arm 27 moves the rod 19 to the left and towards the plates 14, 15 so that the grooves 20, 20a are located in the slots 16, 16a respectively. The squab frame 12 can now be pivoted relative to the seat frame 11 and the plates 15, 15a pass over the rod 19. In any one of the four positions corresponding to the recesses 17 in the squab plates 15, 15a the lever 25 can be released allowing the rod 19 to move back into the position in which the grooves 20, 20a lie to one side of the squab plates. The rod is then again locked in one of the four pairs of recesses 17 in the squab plates 15, 15a and further pivoting movement of the squab frame is prevented.

It will be seen that the mechanism 10 provides four locked positions for the squab frame relative to the seat frame but it will be appreciated that the number of locked positions can be increased by enlarging the plates 15, 15a and increasing the length of the slots and the number of recesses.

A modification of the invention is shown in FIGURES 5 to 7.

In FIGURES 5 to 7 there is shown a vehicle seat frame 30 which is similar to the vehicle seat frame 10 and similar reference numerals are used to indicate similar parts.

In the frame 30 the squab plate 15 is spaced from the seat plate 14 and a coil spring 31 is located around the rod 19 between a washer 32, which is fixed to the rod, and the seat plate 14.

The spring 31 is under compression and urges the rod 19 permanently towards the plates 14a, 15a. The washer 32 acts as a stop and abuts against the squab plate 15 to limit movement of the rod through the plates.

At the other end the rod 19 has a collar 33 adjacent the groove 20a and a bifurcated lever 34 is seated over the rod with its bifurcated end located between the collar 33 and seat plate 14a.

The lever 34 has a bent lug 35, which extends through an aperture 36 in the seat plate 14a and a handle 37. Movement of the handle causes the lever 34 to pivot about the point A so that the bifurcated end of the lever moves the collar 33 and thus the rod 19 against the force of the spring 31 away from the seat plate 14a.

The squab plates 15, 15a are slotted in similar manner to the squab plates of the frame.

In order to adjust the squab the lever 34 is actuated to move the rod into the position in which the grooves on the rod are located in the arcuate slots in the squab plates and the squab frame is then moved into the required position where it is locked by releasing the lever and allowing the rod 19 to move back into the locked position under the action of the spring 31.

The mechanism 10 and the mechanism 30 provide a locking action on both sides of the seat frame which ensures a smooth and easy adjustment and eliminates any tendancy to twist either the seat frame or the squab frame when the squab is being adjusted.

The mechanism also provides a reliable method of pivotally attaching the squab to the seat which provides a high resistance to shear.

What I claim is:

1. An adjustable seat comprising a squab pivoted to a fixed seat, aligned arcuately slotted plates rigidly attached on either side of the squab and rotatable with the squab about the pivotal axis of the squab in planes perpendicular to the pivotal axis and a rod attached to the seat in parallel with the pivotal axis and axially movable through the slotted plates on the squab, the arcuate slots having a plurality of spaced recesses and the rod having two cylindrical locking portions and two portions of reduced diameter, the rod being permanently spring urged into a position in which the locking portions extend through recesses in the slots in the plates and movement of the rod along the slots and pivoting movement of the plates over the rod are prevented and being movable axially in parallel with the pivotal axis against the spring force into a position in which the portions of reduced diameter extend through the slots and the rod is freely movable along the slots allowing pivoting movement of the plates.

2. An adjustable seat as claimed in claim 1, in which the rod is circumferentially grooved adjacent and to the same hand of each plate.

3. An adjustable seat as claimed in claim 2, in which the seat is formed with two fixed plates overlapping the plates on the squab and the rod extends through the seat plates.

4. An adjustable seat as claimed in claim 3, in which the rod is permanently spring urged in one axial direction by a leaf spring attached to one of the seat plates and bearing against an end of the rod.

5. An adjustable seat as claimed in claim 4, in which the rod is axially movable against the said spring by a lever pivoted to the other of said seat plates with one end thereof bearing against the said other end of the rod.

6. An adjustable seat as claimed in claim 3, in which a coil spring is located between the seat plate and squab plate on one side of the squab to permanently urge the rod towards the other side of the seat.

7. An adjustable seat as claimed in claim 6, in which a collar is provided on the rod located between the seat plate and the squab plate on the said other side of the squab and a lever is provided between the seat plate and the collar to urge the rod in an axial direction against the action of the said coil spring.

8. A seat assembly comprising a seat, a squab and means for pivoting the squab with respect to the seat, and locking the squab in selected angular orientation with respect to the seat, the means including a pair of plates rigidly attached to both the squab and the seat, the plates being pivotally connected by a shaft extending perpendicular thereto, the squab plates each having an arcuate slot formed therein on a radius from the pivotal shaft, each of the slots having a plurality of enlarged, spaced recesses along its length, a cylindrical rod extending in parallel with the pivotal shaft, the rod being connected to the seat plates and extending through the slots in the squab plates and being movable in an axial direction only with respect to the seat plates, the rod having a cylindrical locking portion of greater diameter than the width of the slots and reduced portions having a diameter slightly less than the width of the slots, and a spring member normally axially urging the locking portion of the rod into the enlarged recesses in the squab plates whereby the squab is locked against pivotal movement with respect to the seat, the rod being movable axially against the spring member to a free position in which the portions of reduced diameter are positioned in the slots in the squab plates to permit pivotal movement of the squab with respect to the seat.

References Cited

UNITED STATES PATENTS

| 1,856,534 | 5/1932 | Boery | 297—373 |
| 3,051,526 | 8/1962 | Werner et al. | 297—367 |
| 3,099,485 | 7/1963 | Beierbach et al. | 297—373 |
| 3,157,433 | 11/1964 | Davis | 297—379 |
| 3,185,525 | 5/1965 | Welsh | 297—367 |
| 3,259,433 | 7/1966 | Werner | 297—367 |

FOREIGN PATENTS

| 1,347,823 | 12/1964 | France. |
| 510,360 | 1/1955 | Italy. |
| 310,120 | 12/1955 | Switzerland. |

DAVID J. WILLIAMOWSKY, *Primary Examiner.*

FRANK B. SHERRY, *Examiner.*

G. O. FINCH, *Assistant Examiner.*